US005122962A

United States Patent [19]

Gilham

[11] Patent Number: 5,122,962

[45] Date of Patent: Jun. 16, 1992

[54] FRANKING MACHINE

[75] Inventor: Dennis T. Gilham, Ongar, United Kingdom

[73] Assignee: Alcatel Business Systems Limited, Romford, United Kingdom

[21] Appl. No.: 216,012

[22] Filed: Jul. 7, 1988

[30] Foreign Application Priority Data

Jul. 9, 1987 [GB] United Kingdom ................ 8715185

[51] Int. Cl.⁵ ........................ G06F 15/20; B65H 39/00

[52] U.S. Cl. ................................ 364/462.02; 364/478; 177/25.11; 209/3.3; 209/900; 235/375

[58] Field of Search ........................... 364/478, 464.02; 235/375; 209/900, 3.3; 177/25.15, 25.11, 25.13; 400/62; 101/2

[56] References Cited

U.S. PATENT DOCUMENTS

| | | | |
|---|---|---|---|
| 3,904,946 | 9/1975 | Dlugos et al. | 318/685 |
| 4,363,693 | 12/1982 | Fujii et al. | 364/478 |
| 4,742,878 | 5/1988 | Freeman et al. | 177/25.15 |
| 4,797,832 | 1/1989 | Axelrod et al. | 235/375 |

*Primary Examiner*—Parshotam S. Lall
*Assistant Examiner*—V. Trans
*Attorney, Agent, or Firm*—Shoemaker and Mattare, Ltd.

[57] ABSTRACT

A franking machine module is provided with one or more selectively operated mail item feed modules to feed items such as envelopes or labels from hoppers in the feed modules to the franking module. The modules are constructed with common interfaces whereby a number of feed modules may be arranged side by side such that mechanical and electrical drive is transmitted from one module to its adjacent module and feed paths of the modules are co-planar to permit items to be fed into and along a common feed path.

19 Claims, 3 Drawing Sheets

FRANKING MACHINE

BACKGROUND OF THE INVENTION

This invention relates to franking machines.

Known franking machines include a keyboard or other means for selecting a value of postal franking to be printed and means for carrying out accounting functions to maintain a record of the usage of the franking machine. The franking machine also includes means for printing a franking impression having the selected value on a mail item and means for feeding the mail item past the printing means in synchronism with the operation of the printing means. The printing means is arranged to print an officially designated franking which includes variable data such as the value of the franking, the date of franking and a franking machine identification. The printing means may also be arranged to print a slogan alongside the franking impression for advertising or similar purposes. Generally in such franking machines the mail items, consisting of envelopes containing papers, are fed into the franking machine one at a time along a flat bed and are gripped between a printing drum and a pressure roller whereby the franking impression is applied to the envelope by the printing drum. For large mail items which cannot conveniently be fed through the franking machine, the franking is applied to an adhesive label which is then stuck onto the mail item.

It will be appreciated that with franking machines of the type described above each envelope has to be handled twice. First a destination address is applied for example by a typewriter and then the envelope has to be passed through the franking machine to apply the franking impression. Accordingly it would be advantageous to apply the destination address and the franking in a single pass through a machine. It would also be advantageous for the envelopes to be fed to the franking machine automatically without manual intervention.

SUMMARY OF THE INVENTION

According to the invention a franking machine comprises first and second modules, and fastening means for releasably connecting the modules; said first module includes printing means; first feeding means operable to feed a mail item along a first path in the first module past the printing means; and control means operable in response to input signals to control the printing means to print a required franking impression including variable data; said second module includes means to receive a stack of a plurality of mail items; and selectively operable feeding means to feed a mail item from the stack of mail items along at least a part of a second path in the second module to said feeding means of said first module.

The input signals to control the printing means may be generated from an external source such as a computer.

Preferably the second module includes a hopper to receive a stack of mail items; and the selectively operable feeding means includes a rotatable roller for frictional engagement with a leading mail item in the stack and drive means selectively operable to rotate the roller to feed the leading item from the stack.

Preferably the second path extends through the second module and the selectively operable feeding means is arranged to feed the mail item into said second path.

Preferably each module has an interface mutually connectable with an interface on the other module for the transmission of electrical signals. The interfaces may include means for transmission of mechanical power.

The franking machine may include at least two second modules, each second module having an interface mutually engageable with an adjacent second module.

Preferably the first and second paths of the connected modules are co-planar.

The second or each second module may include second feeding means to feed a mail item along the second path.

The first and second feeding means may be driven by a common drive motor.

The selectively operable feeding means in the second or each second module may include a selectively operable drive motor.

Alternatively the selectively operable feeding means and the second feeding means in one said second module are driven by a single motor, the drive to the selectively operable feeding means being via a selectively operable clutch.

In order to guide envelopes of different sizes the hopper may include adjustable guide means.

Preferably the printing means is operable to print a franking impression and a destination address on the mail items.

BRIEF DESCRIPTION OF THE DRAWING

An embodiment of the invention will now be described by way of example with reference to the drawings in which.

DESCRIPTION OF THE PREFERRED EMBODIMENT

Figure 1:
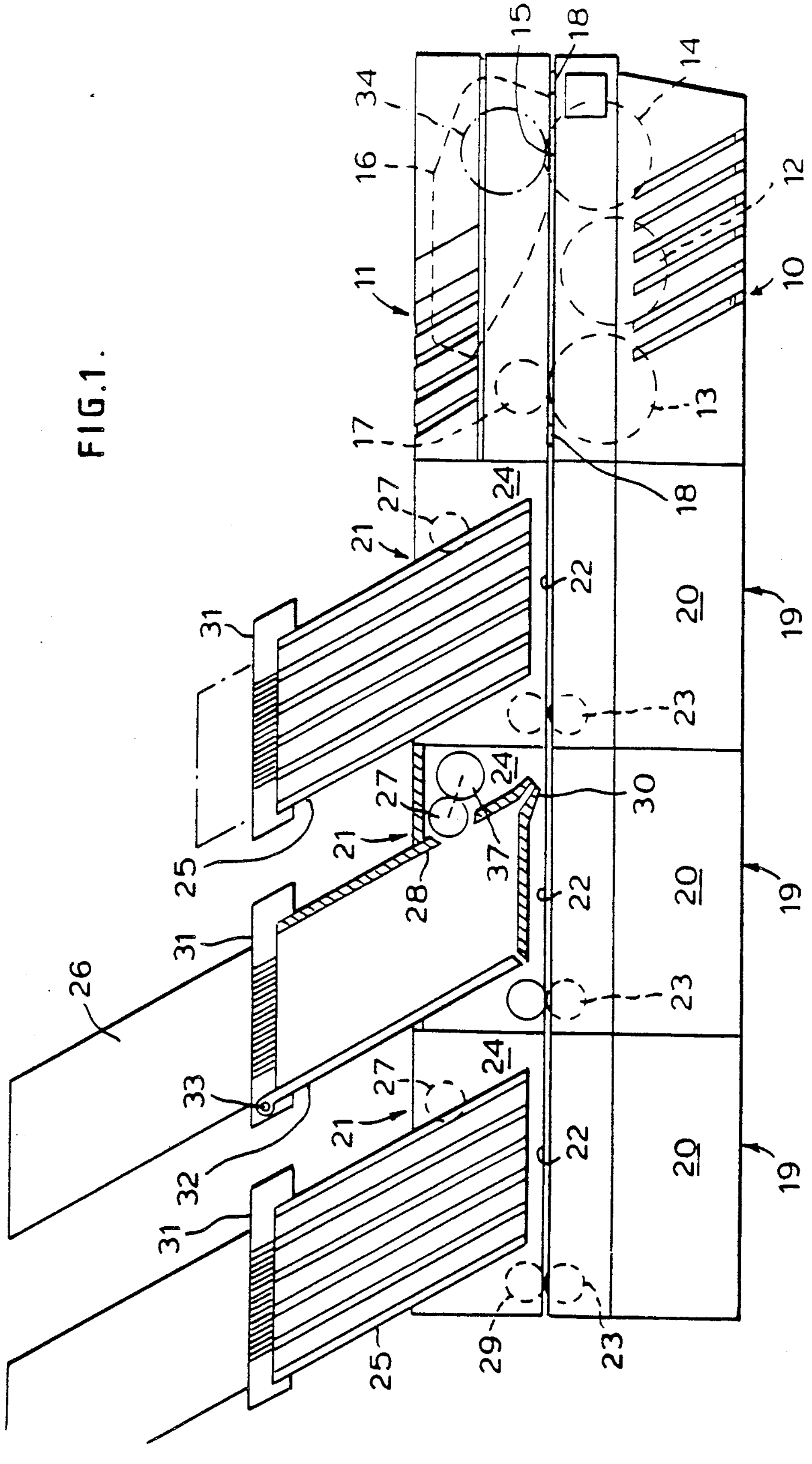
FIG. 1 is a front view partly in section of a franking machine provided with envelope feeds in accordance with the invention.
Figure 2:
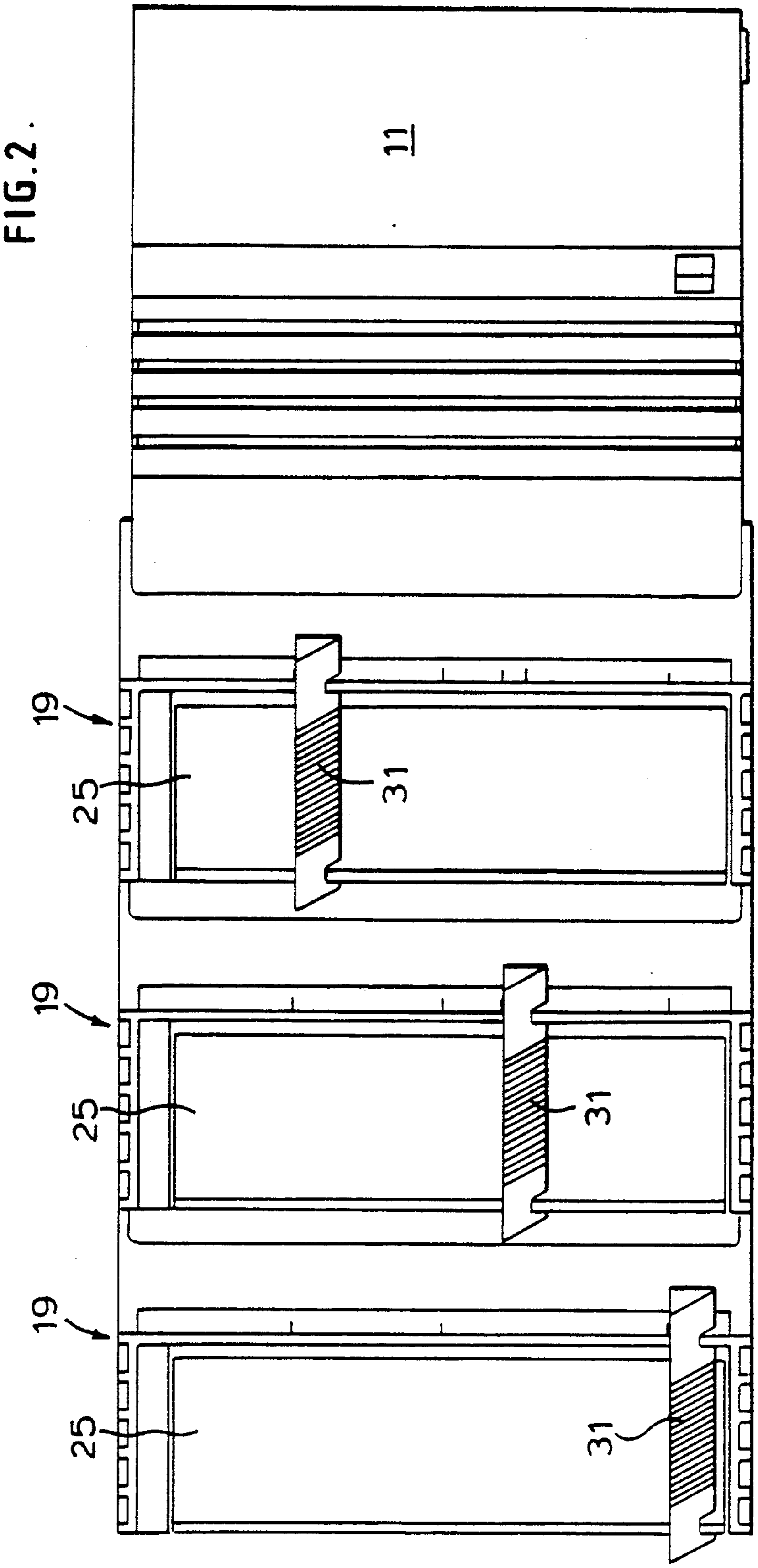
FIG. 2 is a plan view of the franking machine shown in FIG. 1
Figure 3:
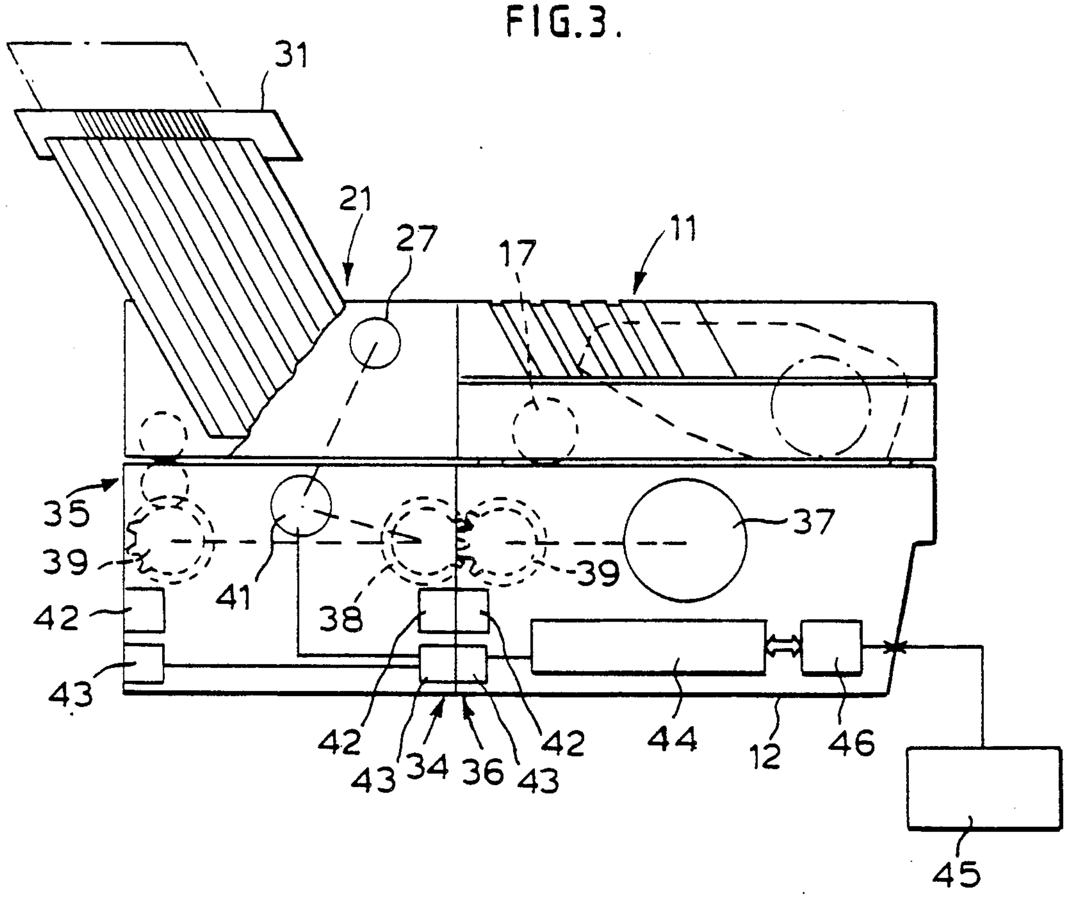
FIG. 3 shows diagrammatically the interfacing between modules of the franking machine.

Referring to the drawings and in particular to FIG. 1, a franking machine comprises a base housing 10 and a cover 11 which is hinged to the base housing 10 along the rear thereof. The base housing 10 houses a main drive motor 12, a feed roller 13 and an impression roller 14. The top of the base housing 10 is formed as a flat bed 15 to provide a path for the feeding of mail items. The peripheries of the feed and impression rollers project through and project slightly from the bed. The base housing also accommodates electronic circuitry 44 for carrying out the accounting and control functions required in a franking machine. The accounting and control functions and the electronic circuits for carrying them out are well known and hence will not be described herein. The cover 11 houses a thermal printer 16 located immediately above the impression roller 14. The thermal printer 16 includes two print heads each having a plurality of elements which can be heated selectively to cause the thermal transfer of ink from inked carrier ribbons contained in replaceable cartridges. The cover 11 also houses a pressure roller 17 disposed to co-operate with the feed roller 13 in the base housing 10. Further pressure rollers 34 are provided to co-operate with the impression roller 14. These further pressure rollers 34 are located to each side of the thermal printer 16 and, if desired, between the two print heads of the thermal printer. The feed roller 13 and the impression roller 14 are driven by the motor 12 via trains of gears or toothed belts (not shown).

The front edge of the cover 11 is supported on the base housing 10 by means of two pairs of support rollers 18, one roller of each pair being mounted on the cover 11 and the other roller of each pair being mounted on the base housing 10 such that the nips of the pairs of rollers lie in a plane between the cover and the base housing. The hinged mounting and the support by the pairs of support rollers of the cover on the base housing is arranged such that a slot in excess of the thickness of the thickest envelope intended to be used extends between the cover and the base housing. The slot is open along the front of the franking machine and hence the use of rollers to support the front of the cover on the base housing permits oversize envelopes to be fed with the excess depth of envelope projecting from the slot.

A franking impression and a destination address are printed on an envelope by feeding the envelope face up into the left hand end of the slot between the cover and the base housing with the upper edge of the envelope toward the rear of the franking machine. Thus the envelope will be gripped between the feed and pressure rollers 13,17 and then mechanically fed due to rotation of these rollers, by the motor 12, along the path to the thermal printer against which it is pressed by the impression roller 14. As the envelope is fed past the thermal printer, the elements of the heads of the printer are selectively heated to transfer ink from the ribbons to the surface of the envelope. One of the print heads, positioned toward the rear of the franking machine, is operated selectively to transfer ink in a desired pattern to form the franking impression and, if desired, a slogan along the upper part of the envelope. The other print head, positioned toward the front of the franking machine, is operated selectively to transfer ink such as to print a desired destination address on a central area of the envelope.

As will be appreciated the franking machine as described above would require manual feeding of envelopes into it. In order to permit the franking machine to be used as a peripheral device to a personal computer system, as is disclosed in co-pending UK Patent application 8716183 and corresponding U.S. patent application Ser. No. 07/216013 filed Jul. 7, 1988, it is desirable to provide means whereby an envelope can be fed into the franking machine in response to a command signal from the personal computer without the need for manual intervention. Accordingly one or more feed hopper modules 19 are provided. In the drawings, three feed hopper modules are shown. The modules 19 are identical units each having a downstream interface 34 on the right hand side, as viewed in the drawings, arranged to provide mechanical and electrical connection to an upstream interface 35 on the left hand side, as viewed in the drawings, of an adjacent module. The base housing 10 of the franking machine is provided with an upstream interface 36 for connection with the downstream interface of an adjacent feed hopper module 19.

Each feed hopper module 19 has a base unit 20 and a hopper unit 21. The base unit 20 of each module has a flat bed 22 forming a path along which an envelope may be fed and a feed roller 23 mounted so that its periphery extends through an aperture in the bed 22. The feed roller may be driven by an electric motor 37 housed within the base unit or may be driven from the main electric motor 12 in the base housing 10. In the latter arrangement, the mechanical interfaces provide mechanical drive connections between modules. For example, a gear wheel 38 may project from the downstream interface 34 of the module so as to enter through an aperture in the adjacent module, or base housing 10, for engagement with a gear 39 in the adjacent module or housing. The hopper unit 21 of each module comprises a cover 24 extending over the base unit 20 of that module and a feed hopper 25 to contain a supply of envelopes, indicated by reference 26. A selectively rotatable picker roller 27 extends through an aperture in a wall 28 of the feed hopper into the interior of the hopper. The picker roller 27 may be driven by an electrical motor 40 disposed in the hopper unit 21 of the module or it may be driven through a selectively operable electro-mechanical clutch 41 from the drive to the feed roller 23 in that module. A freely rotatable pressure roller 29 is mounted in the hopper unit to co-operate with the feed roller 23 in the base unit.

The envelopes are received as a horizontal stack, i.e. with the envelopes lying in planes inclined to the vertical, in the feed hopper and are pressed toward the picker roller 27 by a pressure plate 32 pivotted at 33 and acting under spring action (not shown). The bottom of the hopper 25 is closed apart from an exit throat 30 adjacent the wall 28 through which the picker roller extends. Anticlockwise rotation of the picker roller will cause the first envelope to be fed downwards by frictional engagement between the picker roller and the envelope through the throat 30 in the bottom of the hopper onto the bed 22 of the base unit 20. As a result the leading end of the envelope will bend and be guided by the bed into the nip between the feed roller 13 on the base housing and the pressure roller 17 in the cover 11. When the feed roller 13 is powered by the motor 12, the envelope will be carried to and past the thermal printing heads for printing of the franking and destination address.

The feed hopper modules are secured to each other and to the base housing by means of releasable latches 42. When latched together, the adjoining upstream and downstream interfaces are connected together to effect electrical interconnection by connectors 43 from the base housing to the modules and, when required, mechanical power drive from the main motor 12 in the base housing to the feed rollers 23 in the modules. When latched together, the beds 22 of the modules are coplanar with and form an extension of the bed 15 of the base housing 10.

The operation of an assembly of feed hopper modules in conjunction with the franking machine will now be described. When a command signal, for example from the personal computer 45 to which the franking machine is connected by an input/output interface 46, is received by the control electronics 44 in the base housing, a signal is passed from the control electronics to the adjacent module via the interfaces to energise the drive to the picker roller 27 of that module or via further interfaces to another one of the modules whereby an envelope is fed from the hopper of a selected module to the bed 22 of the module. If the module from which an envelope is fed is the module adjacent the base housing 10, the leading edge of the envelope is fed along the bed 15 to the nip of the feed roller 13 and the pressure roller 17. However if the envelope is fed from one of the other modules, the leading edge of the envelope will be fed to the nip between the feed roller 23 and the associated pressure roller of the adjacent module and thence along the bed 22 to the feed roller 13 and pressure roller 17 of the base housing 10. From this position the envelope is carried to and past the printer as described hereinbefore.

As mentioned above the modules are of identical construction and hence, subject to limits imposed by mechanical considerations and software control of module selection, any number of modules may be latched together to the base housing. The usual reason for provision of more than one module is for the selective supply of a number of different sizes of envelope to the franking machine. Accordingly, the hoppers 24 have a depth, from front to back of the machine, sufficient to accommodate the largest size of envelope intended to be handled. A movable bar 31 is provided to extend across the top entry to the hopper so as to allow the depth of the top entry to be adjusted to accommodate and guide envelopes of smaller size. Preferably, the upper portion of the hopper is provided with a series of recesses, corresponding in position to a series of envelope sizes, in which a detent on the movable bar 31 engages. If desired one or more of the hoppers may contain adhesive labels for attachment to mail items. These labels may be of sufficient size to accommodate not only the franking impression but also a destination address or may be such as to receive only the franking impression.

The modules are individually identified both for addressing by electrical signals from the control circuits 44 in the base housing and for visual identification by a user of the machine. Thus, the user of the machine is aware of which module contains a particular size of envelope and, for example, by keying in an identification of the module containing the desired size of envelope on the keyboard of the personal computer a command signal is transmitted to the control electronics 44 in the base housing 10 to activate the picker roller 27 in that identified module. It will be appreciated that data signals also are transmitted from the computer to the electronics 44 in the base housing representing the value of franking to be printed, the date and the destination address. The franking value may be automatically calculated by the computer from look-up tables relating to the number of sheets of paper to be enclosed in the envelope, the size of envelope to be selected, the postal service required and the destination address.

The covers 24 of the modules are spaced from the base units of the modules at the front so as to provide a continuation of the open slot of the franking machine and thereby allow oversize envelopes to be manually fed into the left hand side of the left hand module and then fed by the feed and pressure rollers to the printer for franking.

While in the above description, the various feed, pressure, picker and impression rollers have been referred to as if they were single rollers extending across the machine any of them may be constructed as a number of rollers spaced along a common shaft. In order to prevent misfeeding or creasing of the envelopes, the feed rollers and picker rollers or drives thereto may incorporate over-run clutches 45.

In order to ensure correct timing of the operation of the printer in relation to the position of the envelope, so that the printing is correctly positioned on the envelope, detection means may be incorporated in the base housing to detect the presence of the leading edge of an envelope and provide a timing signal to the control electronics 44.

Since the feed rollers 23 in the modules do not have any action in the actual selection of envelope feed, these rollers may all be driven together. It is only necessary that the picker rollers of the different modules be selectively driven.

I claim:

1. A machine comprising first and second modules releasably fastened together; said first module including:
 printing means;
 first feeding means to feed a mail item along a first feed path in the first module past the printing means, said first feed path extending from a first upstream end of said first module in a substantially horizontal plane and the first feeding means supporting the mail item to lie in said horizontal plane;
 control means; and
 input means to supply input signals to said control means, said input signals defining information to be printed;
 said control means being responsive to said input signals to control the printing means to print information including
 said information defined by said input signals on mail items as said items pass the printing means;
 said second module including:
 a second feed path extending through the second module from a second upstream end of said second module to a downstream end of said second module, said second feed path being aligned with and providing a continuation of said first feed path in said horizontal plane;
 a hopper to receive a stack of a plurality of mail items, said mail items being supported in the hopper adjacent to and spaced from said horizontal plane and said second feed path;
 a third feed path inclined at an acute angle to said horizontal plane and extending from said hopper to said second feed path said third feed path entering into said second feed path intermediate said second upstream end and said downstream end and
 selective feeding means responsive to a feed signal to feed a leading mail item from the stack of mail items in said hopper along said third feed path into said second feed path intermediate said second upstream end and said downstream end and thence to said feeding means of said first module.

2. A machine as claimed in claim 1 wherein the control means is responsive to input address signals to control the printing means to print destination addresses on the mail items fed along the first feed path.

3. A machine as claimed in claim 1 wherein the hopper is disposed relative to the second feed path to provide a passage for further mail items along said second feed path from the upstream end of the second module past the entry of the third feed path into said second feed path.

4. A machine as claimed in claim 1 wherein the printing means is operable to print a franking impression on mail items and wherein the input signals define a postage value to be printed in the franking impression and the control means is operative in response to said input signals to control the printing means to print said franking impression with said postage value.

5. A franking machine as claimed in claim 4 wherein said second module comprises:

a housing including a lower portion and an upper portion mounted on said lower portion, said upper portion being spaced from said lower portion to provide a slot extending horizontally therebetween, said second feed path extending through said slot;

and wherein the hopper is mounted on the upper portion;

said hopper comprising a lower wall disposed above said second feed path for supporting an edge of each mail item of the stack of mail items;

throat means adjacent said lower wall defining an exit for the leading mail item from the hopper along the third feed path toward the second feed path; and pressure means for urging the leading mail item of the stack into frictional engagement with the selective feeding means.

6. A machine as claimed in claim 5 wherein the first module is provided with an upstream interface at the first upstream end and the housing of the second module is provided with a downstream interface at the downstream end;

said downstream interface including first interface means and said upstream interface including second interface means operatively connected to said first interface means.

7. A machine as claimed in claim 6 wherein the first module includes first drive means to drive the first feed means and wherein the second interface means is operatively connected to said first drive means to transmit drive power from the first drive means via the second interface means to the first interface means in the second module.

8. A franking machine as claimed in claim 7 wherein the selective drive means includes clutch means operatively connected to said first interface means and selectively operative in response to the feed signal to supply a feeding force to the leading mail item in the stack.

9. A franking machine as claimed in claim 8 wherein the second module includes second feed means for feeding mail items along the second feed path, said second feed means being operatively connected to said first interface means.

10. A franking machine as claimed in claim 8 wherein the first and second interface means include electrical connectors connected together to transmit the feed signal from the first module to the selective drive means in the second module.

11. A machine as claimed in claim 9 wherein the second feed means is located in the second feed path upstream relative to the entry of the third feed path into the second feed path.

12. A franking machine as claimed in claim 11 including a plurality of second modules;

said second modules being connected together in line with the second feed paths of the modules being in alignment and with the downstream interface means and the upstream interface means of adjacent second modules being operatively connected.

13. A machine as claimed in claim 12 wherein each upstream interface means includes a first multi contact electrical connector and each downstream interface means includes a second multi-contact electrical connector; the first and second connectors of operatively connected interface means being electrically interconnected;

each of said second modules respectively being configured to receive the feed signal corresponding to that module from the first module via a different one of the contacts of the second connector of that module; and wherein each second module includes electrical connections interconnecting respective contacts of the second multi-contact electrical connector to contacts of the first multi-contact electrical connector to transmit feed signals from the first module to second modules located upstream of that second module.

14. A franking machine as claimed in claim 5 wherein the slot between the lower and upper portions of the housing is open along one edge to accommodate mail items of greater transverse dimension than the second feed path.

15. A franking machine as claimed in claim 4 wherein the selective feeding means includes a rotatable roller for frictional engagement with a leading mail item in the stack.

16. A franking machine as claimed in claim 4 wherein the hopper includes laterally guide means to accommodate mail items of different dimensions in a direction transverse to the feed paths.

17. A machine as claimed in claim 4 wherein the input means of said first module is connectable to a computer to enable the machine to operate as a peripheral device to the computer.

18. A franking machine comprising a first module; a second module releasably fastened to said first module; and a third module releasably fastened to said second module; said first module including:

printing means for printing a franking impression on mail items;

first feeding means to feed a mail item along a first feed path in the first module past the printing means, said first feed path extending from a first upstream end in a substantially horizontal plane and the first feeding means supporting the mail item to lie in said plane; control means; and input means to apply input signals to said control means, said input signals defining a postage value to be printed in the franking impression;

said control means being responsive to said input signals to control the printing means to print a franking impression including said defined postage value on mail items as said items pass the printing means;

said second module including:

a second feed path extending through the second module from an upstream end to a downstream end of said second module, said second feed path being aligned with and providing a planar continuation of said first feed path in an upstream direction in said horizontal plane; second feeding means for feeding mail items along the second feed path;

a first hopper to receive a first stack of a plurality of first mail items, said first mail items being located in the first hopper adjacent to and spaced from said horizontal plane and said second feed path;

a third feed path inclined at an acute angle to said horizontal plane and extending from said hopper to said second feed path, said third feed path entering into said second feed path intermediate said upstream end and said downstream end of said second module and first selective feeding means responsive to a first feed signal to feed a first leading mail item from the first stack of mail items along said third feed path into said second feed path and along said second feed path to said feeding means of said first module;

said third module including:

a fourth feed path extending through the third module from an upstream end to a downstream end of said third module, said fourth feed path being aligned with and providing a continuation of said second feed path in an upstream direction in said horizontal plane;

a second hopper to receive a second stack of a plurality of second mail items, said second mail items being located in the second hopper adjacent to and spaced from said horizontal plane and said fourth feed path;

a fifth feed path inclined at an acute angle to said horizontal plane and extending from said second hopper to said fourth feed path, said fifth feed path entering into said fourth feed path intermediate said upstream end and said downstream end of said third module and second selective feeding means responsive to a second feed signal to feed a second leading mail item from the second stack of mail items along said fifth path into said fourth path and along said fourth path to said second feeding means of said second module and thence via the second feed path to the first feeding means of the first module.

19. A machine as claimed in claim 18 wherein the first hopper is disposed relative to the second feed path to provide a first passage for the second mail items along the second feed path and the second hopper is disposed relative to the fourth feed path to provide a second passage for further mail items along the fourth feed path from the upstream end of the third module past the entry of the fifth feed path into the fourth feed path.

* * * * *